(12) United States Patent
Bonev

(10) Patent No.: US 12,473,115 B2
(45) Date of Patent: Nov. 18, 2025

(54) DEVICE FOR REPAIRING OBJECTS FIXED TO A WEB, WITH A FLEXIBLE FEED MECHANISM OF THE WEB

(71) Applicant: Nikka Research Deutschland GmbH, Leinfelden-Echterdingen (DE)

(72) Inventor: Ivan Bonev, Leinfelden-Echterdingen (DE)

(73) Assignee: Nikka Research Deutschland GmbH, Leinfelden-Echterdingen (DE)

( * ) Notice: Subject to any disclaimer, the term of this patent is extended or adjusted under 35 U.S.C. 154(b) by 231 days.

(21) Appl. No.: 18/312,786

(22) Filed: May 5, 2023

(65) Prior Publication Data

US 2023/0271740 A1 Aug. 31, 2023

Related U.S. Application Data

(63) Continuation of application No. PCT/EP2021/079559, filed on Oct. 25, 2021.

(51) Int. Cl.
*B65C 9/40* (2006.01)
*B31D 1/02* (2006.01)
*B65C 9/18* (2006.01)

(52) U.S. Cl.
CPC ............ *B65C 9/40* (2013.01); *B31D 1/021* (2013.01); *B65C 9/18* (2013.01); *B31D 2201/02* (2013.01); *B65C 2009/404* (2013.01)

(58) Field of Classification Search
CPC ....... B65C 9/40; B65C 9/18; B65C 2009/404; B31D 1/021; B31D 2201/02
See application file for complete search history.

(56) References Cited

U.S. PATENT DOCUMENTS 6,280,544 B1 8/2001 Fox et al.
6,357,503 B1* 3/2002 Kromer .................. B65H 39/14
156/367

(Continued)

FOREIGN PATENT DOCUMENTS

CN 109533538 A 3/2019
DE 296 06 522 U1 6/1996

(Continued)

OTHER PUBLICATIONS

New Oji Paper Co Ltd, JPH0692336 Machine Translation of Description (Year: 2025).*

*Primary Examiner* — Cynthia L Schaller
(74) *Attorney, Agent, or Firm* — Orbit IP, LLP; Marc G. Martino

(57) ABSTRACT

A device has a web feed and a sensor for detecting faulty and fault-free objects fixed to the web. A transposing device in a translation position can transfer a fault-free object onto the web. The transposing device can also, in a discharging position, transfer faulty objects into a bad-part receptacle. During discharging the transposing device brings about a discharging curvature in the web at a discharging point by way of a displacement means. While transferring the object the transposing device brings about a translation curvature in the web at a translation point by way of a displacement means. The transposing device is pivotable into a wrapping position in which a wrapping curvature of a wrapping portion of the web is brought about, which includes the translation point and the discharging point. The maximum value of the wrapping curvature is smaller than the discharging curvature and the translation curvature.

13 Claims, 18 Drawing Sheets

(56) References Cited

U.S. PATENT DOCUMENTS

| | | |
|---|---|---|
| 7,176,799 B1 | 2/2007 | Golicz et al. |
| 7,753,097 B2 | 7/2010 | Dangami et al. |
| 7,871,009 B1 | 1/2011 | Blonigen et al. |
| 7,982,154 B2 | 7/2011 | Wirsching et al. |
| 10,883,942 B2 | 1/2021 | Lin et al. |
| 2005/0247792 A1 | 11/2005 | Benton et al. |
| 2009/0211951 A1 | 8/2009 | Bohn et al. |
| 2011/0114262 A1 | 5/2011 | Kolp et al. |
| 2018/0186496 A1 | 7/2018 | Mevada et al. |
| 2023/0271740 A1 | 8/2023 | Bonev |

FOREIGN PATENT DOCUMENTS

| | | |
|---|---|---|
| DE | 10 2006 028 760 B3 | 11/2007 |
| DE | 10 2011 108 882 A1 | 1/2013 |
| EP | 4240585 A1 | 9/2023 |
| JP | H06-92336 A | 4/1994 |
| JP | 2001-278511 A | 10/2001 |
| JP | 2003-334872 A | 11/2003 |
| JP | 2006-035555 A | 2/2006 |
| JP | 2009-506904 A | 2/2009 |
| JP | 2016-210028 A | 12/2016 |
| WO | 2013/013812 A1 | 1/2013 |
| WO | 2021/181252 A1 | 9/2021 |
| WO | 2022/096308 A1 | 5/2022 |

\* cited by examiner

DEVICE FOR REPAIRING OBJECTS FIXED TO A WEB, WITH A FLEXIBLE FEED MECHANISM OF THE WEB

CROSS-REFERENCE TO RELATED APPLICATIONS

This continuation application claims priority to PCT/EP2021/079559 filed Oct. 25, 2021 which has published as WO 2022/096308 A1 and also the German application number 10 2020 214 042.1 filed on Nov. 9, 2020, the entire contents of which are fully incorporated herein with these references.

DESCRIPTION

Field of the Invention

The invention relates to a device for repairing and/or inspecting objects fixed to a web, wherein the device has:
a. a web feed for feeding the web in a feed direction;
b. a first sensor for selection of fault-free objects on the web that meet a predetermined selection criterion and/or faulty objects on the web that do not meet the selection criterion;
c. a bad-part receptacle for receiving the faulty objects;
d. a receiving point on the web or a further web for receiving at least one fault-free object;
e. a transposing device for transferring faulty objects from the web into the bad-part receptacle in a discharging position of the transposing device, in which, during the discharging, by means of an in particular first displacement means the transposing device brings about a discharging curvature of the web at a discharging point of the web for discharging the objects, and for transferring the fault-free object from the web to the receiving point in a translation position of the transposing device, in which, during the transferring of the object, by means of an in particular second displacement means the transposing device brings about a translation curvature of the web at a translation point of the web for transferring the fault-free object.

The invention further relates to a method for repairing and/or inspecting objects on the web with this device.

Background of the Invention

Such devices are known from the prior art:

US 2018/0186496 A1 relates to a device for sorting out faulty labels from a labeling machine. A label belt with a plurality of labels is moved from an initial station to a destination station. An inspection unit recognizes the faulty labels, which are sorted out by a sorting unit. Subsequently, the faulty labels are collected in a collection unit. A labeling unit labels products with good labels.

DE 296 06 522 U1 discloses a labeling device for a packaging machine with a first belt conveyor for a carrier belt coated with labels. A conveyor switch has a deflecting device which causes such a (high) transverse curvature of the carrier belt that the reverse side of the labels, which is covered with an adhesive layer, are detached from the carrier belt in a spreading manner when passing the deflection device. The conveyor switch has a second deflecting device which disables the first when it is switched on, and which causes such a (slight) transverse curvature on the carrier belt that the front side of the labels remains adhered with its entire surface to the carrier belt when passing the second deflection device.

US 2005/0247792 A1 relates to a device for selectively peeling off a label from a strip of labels. The device has a peel bar with a beak for peeling a label from the strip. The peel bar is mounted so that it can be rotated around a longitudinal axis by the movement of the strip. A retaining element selectively engages into the peel bar. The retaining element has a first position in which the peel bar is held stationary and a second position in which the peel bar is freely rotatable.

U.S. Pat. No. 7,871,009 B1 relates to a device for monitoring whether radio frequency identification (RFID) tags are detached from a web carrier. A frame of the device has first and second side parts between which a peel bar is disposed. The peel bar has a radial section that causes an RFID tag to be separated from the surface of the web carrier when the web carrier contacts and moves over the radial section. A cam rod is rotatably mounted on the frame. In a first position, the cam rod causes the web carrier to contact and move at least partially around the radial portion of the peel bar, and in a second position the cam rod prevents the web carrier from contacting and moving at least partially around the radial portion of the peel bar.

US 2011/0114262 A1 discloses a system for dispensing adhesive-coated labels. The system comprises a housing assembly defining a first dispensing outlet and a system for conveying a supply of label material along an advance path that operates so as to move the label material along the advance path in two directions. Further, the system comprises a peel bar that can be positioned from a first position to a second position in order to bring about an abrupt change in direction in its advance path, causing the upper material to separate from the backing material. By separating the upper material from the backing material, an application-ready label is produced. A processor controls the bi-directional displacement of the conveyor system and positions the peel bar within the housing such that the label material is (i) conveyed downstream of the peel bar when the peel bar is in the first position, and (ii) pulled back over the peel bar to cause a rear edge of the upper material to separate from the backing material when the peel bar is in the second position.

In the method disclosed in JP 2016 210 028 A, a tape is unwound from a roll, and labels on the tape are conveyed to a read/write device. The read/write device writes an ID in the form of a barcode on each IC label. The read/write device reads the ID and forwards the information to a controller. A printing device prints the ID on labels on which the ID was correctly written by the writing device. If the ID was not correctly written onto the label, the printing device prints a marking to that effect on the label. Subsequently, the label is conveyed to a camera and a barcode reader. The read information is transmitted to the controller. The labels written without errors are transferred in a dancer section. Faulty labels are sorted out by a pick-up belt which is moved by the controller to the dancer section.

U.S. Pat. No. 6,280,544 B1 discloses a method for forming labels with information on the front side and an electronic marking: A label strip with a front side with information and a rear side with adhesive is provided. The label strip is inserted into a marking machine. An electronic marking is applied to the back side of a label of the strip while being separated from a backing by bringing an inner surface of the marking into contact with the back side using adhesive. The marking-label arrangement is conveyed away by a conveyor belt.

U.S. Pat. No. 7,176,799 B1 discloses a method in which RFID transponders are attached to the underside of markings to form assemblies that can be attached to goods. For this purpose, the transponders are detached from webs and situated again on the web while being joined with the markings at a position downstream in the transport direction in order to form the assemblies. The assemblies are read out by sensors. Faulty assemblies are sorted out and conveyed away by a removal web.

CN 109 533 538 A discloses a method for sorting out defective labels, comprising the following steps: Image information of labels that are conveyed on a label tape is recorded by a visual inspection mechanism. The information is analyzed. If the image information corresponds to a faulty label, a roll presses down onto the label tape, so that the faulty label adheres to a reject tape. If the image information corresponds to a normal label, the label tape continues to move unchanged. Replacement labels are placed by a replacement label mechanism from a replacement label tape at the location of the faulty label.

DE 10 2006 028 760 B3 discloses a sorting device with a dispensing unit for feeding RFID labels to a dispensing area where the labels are detached from a conveyor belt. The labels are received in a dispensing unit on a respective conveyor belt of transport units. A positioning device positions the dispensing area and a receiving dispensing area having the conveyor belt suitably to each other for this purpose.

DE 10 2011 108 882 A1 describes a device for sorting labels on a carrier tape with a carrier tape buffer and with a selection element. In a first position of the selection element, the labels are offset on the carrier tape. In a second position of the selection element, the labels are guided onto the carrier tape buffer, from where they are removed by a removal device. A control device controls the movement of the selection element on the basis of the signals of a monitoring device.

In the known devices, the web feed, in particular the unwinding mechanism of the web from the roll, is made having comparatively low flexibility.

SUMMARY OF THE INVENTION

Object of the Invention

It is therefore the object of the present invention to provide a device for repairing and/or inspecting objects fixed to a web, in which the feeding of the web can take place more flexibly. It is also the object to specify a corresponding method for repairing and/or inspecting objects fixed to a web, in particular with such a device.

This object is achieved according to the invention by a device according to claim 1 and a method according to claim 10. Advantageous embodiments result from the respectively dependent claims.

The device according to the invention is characterized by a wrapping position of the transposing device for maintaining the original positions of the objects on the web prior to feeding the web, in which the transposing device brings about a wrapping curvature of a wrapping section of the web during the feeding of the entire web or an adjustable part of the web, said wrapping section comprising the translation point and the discharging point, wherein the maximum value of the wrapping curvature is smaller than the discharging curvature and the translation curvature.

When the transposing device assumes the wrapping position, the web can be moved faster without engagement of the transposing device in the web than if the transposing device assumes the translation position or the discharging position, so that the processing of the objects is accelerated. The web can be moved quickly up to a desired point, for example a faulty object. In the wrapping position of the transposing device, the web can be fed completely or partially and moved back against the feed direction. This enables corrections and better control of the processing of the objects. A section of a web without objects can also be conveyed particularly quickly through the device for the purpose of a line clearance in the wrapping position of the transposing device.

The direction of movement of the objects during the first feeding of the web is referred to in particular as the feed direction or feed direction of the objects. The feed direction corresponds in particular to the forward direction of the objects during the first feeding of the web. The reverse direction is opposite the feed direction.

The discharging point is in particular the location on the web from which the faulty objects are transferred into the bad-part receiver during the discharging. In some embodiments, of all locations of the web, the discharging point has the closest proximity to the bad-part receptacle during the discharging. The translation point is in particular the location on the web from which the at least one fault-free object is transferred to the web or the further web during the transferring. During the transferring, of all locations of the web, the translation point has the closest proximity to the receiving point, in some embodiments.

The term curvature of the web at a point refers in particular to the deviation of the web from a straight-line course of the web at that point or the change of direction of the web at that point. In particular, the curvature at a point on the web is given as the reciprocal of a radius of curvature, which is the radius of the circle that best approximates the web at that point. Another designation for curvature is in particular bending. The curvature of the web can assume different values along the web. The discharging curvature designates in particular the curvature of the web at the discharging point. The translation curvature designates in particular the curvature of the web at the translation point. The translation curvature and the discharging curvature cause, in particular, a separation of an object from the web at the translation point or the discharging point due to the inherent stiffness of the object. The wrapping section extends in particular from the discharging point to the translation point. The wrapping curvature designates in particular the curvature along the web in the wrapping section. The wrapping curvature can have different values along the web. The wrapping curvature has in particular smaller values than the discharging curvature and the translation curvature. In particular, the maximum absolute value of the wrapping curvature is smaller than the absolute value of the discharging curvature and the absolute value of the translation curvature.

The first displacement means and/or the second displacement means are designed to press against the web and to cause a bending or curvature of the web. The first displacement means is in particular identical to the second displacement means.

The term predetermined selection criterion also comprises the case in which multiple selection criteria are specified. The adjustable part of the web can also comprise multiple adjustable parts of the web. The term "engage" has in particular the meaning of "press against something" or altering the curvature of the course of the web in a targeted manner.

A receiving point is in particular the point on the web or the further web to which a fault-free object is transferred in each case. Each receiving point is located in particular at the same spatially fixed receiving position while an object is transferred to this receiving point during the transferring. In the following text, however, the concept of the position which the receiving point assumes during the transfer of the object to the receiving point is also intended to comprise the possibility that different receiving points assume different positions during the transferring of the respective object.

The objects are in particular designed as labels. The objects are preferably attached to the web by adhesive.

In the mounted state of the device, the first sensor is arranged in particular above the web. The first sensor can alternatively be arranged laterally on the web or below the web.

The device automatically removes the faulty objects, in particular in the form of labels, and supplies fully assembled rolls. A single-lane process on the device produces, in particular, fault-free rolls of objects, preferably rolls of labels, which preferably satisfy specifications in the pharmaceutical sector. The invention relates in particular to a device for repairing and/or inspecting rolls with objects fixed to a web, the device comprising:
a. a roll mechanism for unrolling the web from a roll;
b. a first sensor for detecting fault-free and/or faulty objects on the web;
c. a bad-part receptacle for receiving the faulty objects;
d. a receiving point on the web or a further web for receiving at least one fault-free object;
e. a transposing device for transferring faulty objects from the web into the bad-part receptacle in a discharging position of the transposing device, in which the transposing device has a discharging distance from the bad-part receptacle during the transferring, and for transferring the fault-free object from the web to the receiving point in a translation position of the transposing device in which the transposing device has a transfer distance from the receiving point during the transferring of the object;
f. a wrapping position of the transposing device for maintaining the original positions of the objects on the web prior to the unrolling of the web, in which the transposing device, during the unrolling of the entire web or an adjustable part of the web, has a greater distance from the position which the receiving point assumes during the transferring of the object to the receiving point than the transfer distance and a greater distance from the bad-part receptacle than the discharging distance.

When the transposing device assumes the wrapping position, the web can be moved faster without engagement of the transposing device with the web than when the transposing device is oriented in the translation position or the discharging position, so that the processing of the articles is accelerated. The web can be quickly unrolled up to a desired point, for example a faulty object. In the wrapping position of the transposing device, the web can be unrolled entirely or partially from the roll and rolled up again. This enables corrections and better control of the processing of the objects. A section of a web without objects can also be conveyed particularly quickly through the device for the purpose of a line clearance in the wrapping position of the transposing device.

In addition to setup and maintenance operation, the device has the following operating modes:

1. Wrapping (in the feed direction and the reverse direction)
2. Wrapping with control and/or alignment of the web (in the feed direction and the reverse direction)
3. Unrolling the web with wrapping, discharging and/or transferring the objects and control of the web (in the feed direction)
4. Unrolling the web with wrapping, discharging and/or transferring the objects and control of the web (in the reverse direction)
5. Winding waste (in the feed direction and the reverse direction)
6. Winding line clearance (in the feed direction)

PREFERRED EMBODIMENTS OF THE INVENTION

A preferred embodiment of the device is characterized in that the transposing device has at least one transfer edge, in particular for advancing the web in the discharging position and/or the translation position of the transposing device. In particular, the first displacement means and/or the second displacement means is designed as a transfer edge. The transfer edge is in particular in the shape of a wedge. The transfer edge moves into the web and causes a curvature of the web, in particular, in the case of a particularly strong curvature, a bend of the web with an acute bending angle. A front end, in the feed direction, of an object fixed, in particular glued, to the web is detached from the web, in particular at the point of the bend, by the inherent rigidity of the object and is conveyed in the direction of the receiving point or the bad-part receptacle. The transfer distance and the discharging distance are smaller than the length of the object in the feed direction so that the front end of the object reaches the receiving point or the bad-part receptacle before the rear end of the object is separated from the web. As a result of the movement of the web, the object is then pushed into the bad-part receptacle or onto the web or the further web at the receiving point, or is transferred thereto. As a result, the object is discharged or transferred.

A development of this embodiment is characterized by a pivoting mechanism for pivoting the transfer edge between the discharging position, the translation position and/or the wrapping position, wherein in particular the transfer edge is formed on a rotary disk, on which in particular the web extends in the wrapping position of the transfer edge. The pivoting mechanism brings about different orientations and/or positions of the transfer edge that correspond to the discharging position, the translation position and/or the wrapping position.

A rotation of the rotary disk brings about the different orientations of the transfer edge in a space-saving way, which orientations correspond to the discharging position, the translation position and/or the wrapping position. In the wrapping position, the transfer edge faces away from the bad-part receptacle and/or the position of each receiving point during the transfer of the respective object, so that the rotary disk is arranged between the transfer edge and the bad-part receptacle and/or this position of the receiving points. In this case, the web preferably runs over the rotary disk. The curvature of the web along the rotary disk changes continuously, assuming comparatively small values in relation to the curvature of the web at the discharging point during discharging or at the translation point during transferring, so that no objects are detached from the web.

A further development of the above embodiments is characterized in that the transfer edge is formed on a pivot arm, in particular for pivoting the transfer edge from the wrapping position to the discharging position. The pivot arm enables a larger radius of the pivot movement of the transfer edge. The transfer edge can additionally be mounted pivotably on the pivot arm.

Advantageously, the transposing device has a first and a second transfer edge, wherein in particular the first transfer edge is arranged closer to the bad-part receptacle than the second transfer edge and the second transfer edge is arranged closer to the position which each receiving point assumes during the transfer of the respective object to the receiving point than the first transfer edge, or the transfer edges are arranged at the same distance from the bad-part receptacle. In embodiments in which the first transfer edge is arranged closer to the bad-part receptacle and the second transfer edge is arranged closer to the position that each receiving point assumes during the transfer of the respective article to the receiving point, the first transfer edge assumes the discharging distance to the bad-part receptacle in the discharging position of the transposing device and the second transfer edge assumes the transfer distance to the respective receiving point in the transfer position of the transposing device. In embodiments in which the transfer edges are arranged at equal distances from the bad-part receptacle, the discharging in particular can take place through both transfer edges.

In preferred embodiments of the device, the bad-part receptacle is arranged in the feed direction of the objects upstream of the position of each receiving point during the transferring of the respective object onto the receiving point. If the discharging and transferring occurs during the feeding of the web in the feed direction, then in particular the discharging takes place temporally before the transferring. At the location on the web from which the objects are transferred, only fault-free objects are thus located on the web.

A further embodiment of the device provides that a web storage device for passing through a storage section of the web with adjustable length is arranged as part of the transposing device or downstream of the transposing device in the feed direction of the objects. The web storage device is designed to be adjustable in its extension so that the capacity of the web storage device can be changed with respect to the length of the portion of the web that the web storage device receives. The web can be slowed down or stopped downstream of the web storage device, the capacity of the web storage being increased so that the web is received in or downstream of the transposing device in the web storage device. In particular, when the objects are being transferred, the web can be stopped in order to enable a precise transfer to a receiving point on the web. Here the receiving point is arranged downstream of the web storage device when the respective object is being transferred along the web in the feed direction of the objects.

A further development of this embodiment is characterized in that the web storage device has at least one web storage roll which engages in the web in an activated state of the web storage device. In particular, the web storage roll presses against the web in the activated state of the web storage device. Preferably, the web storage device has multiple web storage rolls. During activation of the web storage device, the web storage rolls are in particular displaced relative to one another, and they engage in the web. The web is then realized in the shape of a meander or arc, with an extension transverse to the course of the web in the event that the web storage device is deactivated. An increasing displacement of the web storage rolls increases the capacity of the web storage device. The web storage rolls are preferably arranged in the form of rows along the web, opposite to each other and spaced apart from the web when the web storage device is deactivated. To activate the web storage device, the rows are moved transversely to the web and the web storage rolls are moved past one another.

Advantageous are a first dispensing roll, a second dispensing roll, a first receiving roll and a second receiving roll, wherein the web is unrolled from the first dispensing roll and rolled onto the second receiving roll, and the further web is rolled off from the second dispensing roll and rolled onto the first receiving roll. In particular, the web feed has the first dispensing roll and/or the second dispensing roll. In this embodiment, the further web is movable independently of the web, at its own speed. A separately unrollable further web represents an alternative to a web storage device. The objects are, in particular, transferred from the web to the further web during the transferring. The receiving point for each fault-free object is located on the further web.

A preferred embodiment is characterized in that the first sensor, and in particular a second sensor, is arranged in the feed direction of the objects upstream of the transposing device, on the transposing device and/or downstream of the transposing device and/or upstream of the receiving point and/or downstream of the receiving point. The embodiment is preferably characterized by at least one second sensor which is arranged on the web, wherein in the feed direction of the objects, in particular the first sensor is arranged upstream of the transposing device and at least the second sensor is arranged downstream of the transposing device. While the first sensor detects faults on the objects in particular, the second sensor is used, among other things, to determine the position of the objects on the web, in particular after the transferring. The first sensor and/or the second sensor are located in particular on the transposing device when they are oriented to a section of the web in the transposing device. The first sensor and/or the second sensor are used to detect features of the objects, in particular after printing of the objects by a processing unit (see below), in order for example to mark the objects individually. After an object is detected as faulty by the first sensor and/or the second sensor, the object can in particular be marked as faulty. In an embodiment of the device with the web and the further web, the first sensor and/or the second sensor are used in particular to detect the features of objects on the further web, in particular after the at least one fault-free object has been transferred from the web to the further web. This relates, in particular, to embodiments in which objects are fixed to the further web already before the fault-free object is transferred.

Furthermore, the device preferably has a controller for controlling the device. The controller receives in particular the signals of the first sensor and preferably controls the web and the transposing device according to external specifications.

The device preferably has at least one processing unit which is arranged on the web, wherein in the feed direction of the objects, in particular the processing unit is arranged upstream of the transposing device and at least one further processing unit is arranged downstream of the transposing device. The processing units are designed as, inter alia, printers or punches. They are used in particular for individual shaping of the objects or the web, in particular for pharmaceutical applications. The processing units can be used for various steps for processing the objects or the web such as laminating, dispensing, drying, lasering, punching or printing. By means of a printing by a processing unit, in particular faulty objects are marked as faulty.

The device preferably has an interface for storing data and/or for exchanging data with an external data source. The external data source provides, in particular, data with which the information provided by the first sensor is compared in order to distinguish between faulty and fault-free objects.

A method, in particular using a device according to one of the preceding claims, for repairing and/or inspecting objects fixed to a web using a transposing device, wherein the transposing device can be oriented into a discharging position in which, during the discharging, the transposing device brings about a discharging curvature of the web by means of a first displacement means at a discharging point of the web for discharging faulty objects and/or the transposing device can be oriented into a translation position in which the transposing device, during the transferring of at least one fault-free object, brings about a translation curvature of the web at a translation point of the web by means of a second displacement means in order to transfer the fault-free object, wherein the web is guided by a web feed in a feed direction, is characterized in that during the feeding of the entire web or a set part of the web the transposing device is oriented into a wrapping position in which the transposing device brings about a wrapping curvature of a wrapping section of the web that comprises the translation point and the discharging point, the maximum value of the wrapping curvature being less than the discharging curvature and the translation curvature.

The web can be moved particularly quickly when the transposing device is oriented in the wrapping position. During the processing of the objects, the web can be fed completely or partially and moved back against the feed direction, so that corrections are possible during the method.

Preferably, a method for repairing articles fixed to a web using a transposing device, wherein the transposing device is orientable into a discharging position in which it has a discharging distance from a bad-part receptacle for receiving faulty objects and/or the transposing device is orientable into a translation position in which it has a transfer distance from a receiving point on the web or a further web for receiving the fault-free object during transferring of a fault-free object, in particular using a device according to one of the above-named embodiments, the web being unrolled from a roll, is characterized in that the transposing device, during the unrolling of the entire web or of a set part of the web, is oriented in a wrapping position in which the transposing device assumes a greater distance from the position assumed by the receiving point during the transfer of the object to the receiving point than the transfer distance and assumes a greater distance from the bad-part receptacle than the discharging distance.

In the method, in particular using a device according to one of the above-named embodiments, for repairing rolls with objects fixed to a web using a transposing device, in particular the transposing device is oriented in a discharging position in which it has a discharging distance from a bad-part receptacle for receiving faulty objects and/or the transposing device is oriented in a translation position in which it has a transfer distance from a receiving point on the web or a further web for receiving the fault-free object during transferring of a fault-free object, the web being unrolled from a roll and/or the transposing device during the unrolling of the entire web or a set part of the web being oriented in a wrapping position in which the transposing device assumes a greater distance from the position that the receiving point assumes during the transferring of the object than the transfer distance and assumes a greater distance from the bad-part receptacle than the discharging distance.

The web can be moved particularly quickly when the transposing device is oriented in the wrapping position. During the processing of the objects, the web can be unrolled completely or partially and rolled up again so that corrections are possible during the method.

The web can be wound in the feed direction or in the reverse direction, while the transposing device is oriented in the wrapping position. Here no objects, in particular labels, are transferred or discharged. The web storage device is preferably deactivated here. This process takes place at high speeds in comparison with the case in which the transposing device is oriented in the translation position or the discharging position.

In particular, the web stops during the transferring so that objects can be placed at the respective receiving point and thus empty spaces on the web can be filled. The discharging of the objects takes place in particular at a constant web speed.

An advantageous embodiment of the method is characterized in that a first sensor detects the fault-free and/or faulty objects on the web. The first sensor is arranged in particular in the feed direction of the objects upstream of the bad-part receptacle and/or the transposing device. A second sensor can be arranged downstream of the bad-part receptacle and/or the transposing device.

A further development of the above-named embodiment is characterized by the following successive steps:
  i. the web is initially fed, wherein the transposing device is oriented in the wrapping position or the translation position;
  ii. the first sensor detects a faulty object;
  iii. the rest of the web is subsequently fed, wherein the transposing device is oriented in the discharging position and/or the translation position and/or the wrapping position.

With this further development of the method, the web is unrolled particularly quickly until the first sensor detects the faulty object, in particular the first faulty object in the feed direction, so that the method is accelerated.

A preferred embodiment of the method is characterized by the successive steps:
  iv. the web is first moved completely or partially against the feed direction;
  v. the web is subsequently fed completely or partially in the feed direction, wherein the transposing device is oriented in the discharging position, the translation position and/or the wrapping position.

The objects on the web are checked in particular during the movement of the web against the feed direction. During the subsequent feeding of the web, the transferring or discharging takes place. The feeding in particular takes place in each case exactly on a length of the web in which the faulty label is positioned on the transposing device for transferal.

In particular, the faulty and fault-free objects are detected during the wrapping. By means of algorithms and/or manual inputs, an optimized or adapted sorting is preferably determined after the movement of the web against the feed direction. Subsequently, the sorting according to the specifications is carried out during the feeding of the web.

After the movement of the web against the feed direction of the web, an incorrect classification of objects as fault-free or faulty can still be corrected before the transferring or discharging in the feed direction. This reduces rejects.

In embodiments in which the faulty objects are discharged and/or the fault-free objects are transferred during the feeding of the web, the movement in the opposite direction to the feed direction can take place particularly quickly if the transposing device is oriented in the wrapping position.

A development of the method is characterized in that the first sensor detects the fault-free and/or faulty objects on the web while the web is moved according to step iv), wherein features of the objects detected in particular by the first sensor are stored when the web is moved according to step iv). In this development, the distinguishing of the objects into fault-free and faulty objects, which is carried out by the first sensor during the movement of the web, can be checked for correctness after the movement of the web. Subsequently, the discharging of the faulty and/or transferring of the fault-free objects takes place during the feeding of the web in the feed direction. The features are stored in particular in the interface. In step v), the data with respect to the stored features are preferably retrieved again, preferably from the interface.

A further embodiment of the method in conjunction with the embodiment of the device with the first and second dispensing roll and the first and second receiving roll is characterized in that the web with the objects fixed to the web is unrolled from the first dispensing roll and rolled up onto the second receiving roll, wherein the transposing device discharges the faulty objects and/or transfers the fault-free object from the web to the further web, wherein the further web is unrolled from the second dispensing roll and rolled up onto the first receiving roll, wherein objects are formed on the further web or the further web is formed free of objects. In one embodiment, objects are arranged on the further web upstream of the receiving point, or in another embodiment, no objects are so arranged. In particular, the second receiving roll winds up the web after the faulty objects have been discharged and the at least one fault-free object has been transferred. In the embodiment in which no object is arranged on the further web, the at least one fault-free object is transferred to the object-free further web. In the embodiment in which the further web has objects, in particular labels, the at least one fault-free object is preferably placed or transferred onto at least one of the objects on the further web. In particular, multi-layer labels are thereby produced.

One embodiment of the method comprises the following steps:
1. During the unrolling and/or rolling up of the web, the first sensor detects features of the objects by which faulty and fault-free objects can be distinguished from one another.
2. A controller processes the information from the features and controls the transposing device.
3. The transposing device assumes one of the following positions: a translation position, a discharging position and/or a wrapping position.

Further advantages of the invention can be found in the description and the drawings. Likewise, the aforementioned features and those which are to be explained below can each be used individually or together in any desired combinations. The embodiments shown and described are not to be understood as an exhaustive list, but, rather, have an exemplary character for the description of the invention.

DETAILED DESCRIPTION OF THE INVENTION AND DRAWINGS

Figure 1:
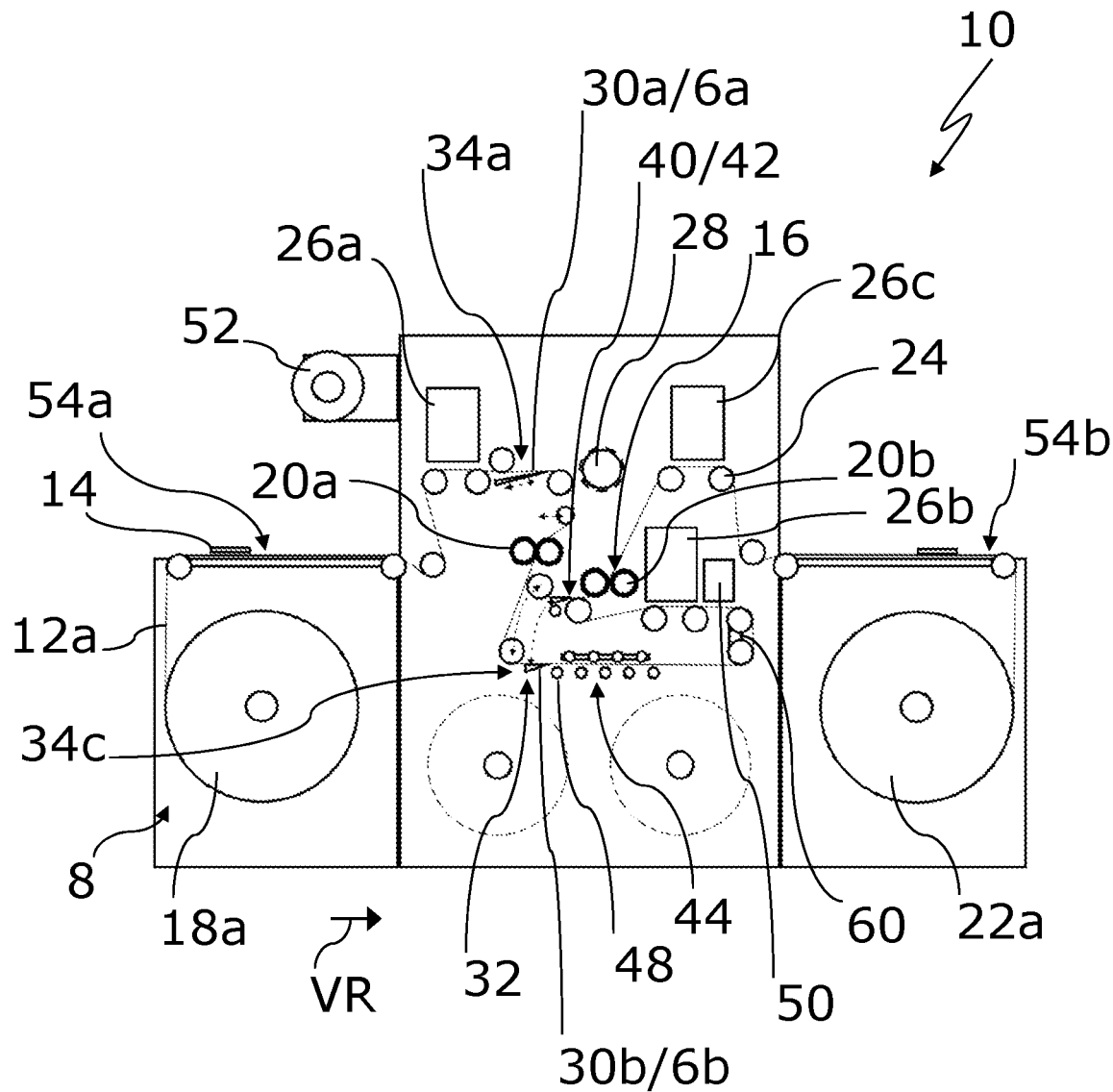
FIG. 1 schematically shows a first embodiment of a device for repairing objects fixed to a web.

FIG. 1 schematically shows a device 10 for repairing objects 14, in particular labels, fixed to a web 12*a*. A web feed 8 for feeding the web 12*a* has a rolling mechanism 16 for unrolling the web 12*a* from a winder in the form of a first dispensing roll 18*a*, which is equipped with advance units 20*a*, 20*b* for conveying the web 12*a*. The web 12*a* is moved from the first dispensing roll 18*a* to a first receiving roll 22*a* in the feed direction VR of the objects 14 on transport rolls 24 to orient the web 12*a*. A first sensor 26*a* in the form of a first camera on the web 12*a* is used to detect fault-free and/or faulty objects 14 on the web 12*a*. At a bad-part receptacle 28 downstream of the first sensor 26*a* in the feed direction VR, the faulty objects 14 are discharged. For this purpose, a first displacement means 6*a*, which has a first transfer edge 30*a*, of a transposing device 32 is oriented in a discharging position 34*a* (cf. FIG. 4*b*) in which the first transfer edge 30*a* assumes a discharging distance 36*a* (cf. FIG. 4*b*) from the bad-part receptacle 28. The bad-part receptacle 28 has in particular a bad-part receiving web for receiving the faulty objects (not shown). The objects 14 are transferred from the web 12*a* into the bad-part receptacle 28 when the first transfer edge 30*a* is in the discharging position 34*a*.

In the feed direction VR, a second displacement means 6*b*, which has a second transfer edge 30*b*, of the transposing device 32 is arranged downstream of the first transfer edge 30*a*. The second transfer edge 30*b* of the transposing device 32 can be pivoted to a translation position 34*b* by a pivot mechanism 38 (cf. FIG. 2), wherein the second transfer edge 30*b* has a transfer distance 36*b* (cf. FIG. 4*a*) from a receiving point 40 on the web 12*a* for receiving a fault-free object 14 (cf. FIG. 4*a*).

The second transfer edge 30*b* is in a wrapping position 4*c*. In the wrapping position 34*c*, the first transfer edge 30*a* is spaced farther from the bad-part receptacle 28 than the discharging distance 36a (see FIG. 4b) and the second transfer edge 36b is spaced farther from a position 42 of the receiving point 40 during the transferring than the transferring distance 36b (see FIG. 4a). The web 12a slides along the second transfer edge 30b, with a straight-line course.

Downstream of the second transfer edge 30b is a web storage device 44 is arranged for temporarily accommodating a storage section 46 of the web 12a (see FIG. 4a) of adjustable length. The web storage device 44 has web storage rolls arranged in rows 48 for engaging in the web 12a. When the transposing device 32 is oriented in the wrapping position 34c, as shown in FIG. 1, the web storage device 44 is deactivated, wherein the web storage rolls 48 are arranged at a distance from the web 12a.

A processing unit 50, in particular a printer or a punch, is arranged downstream of the web storage unit 44 in the feed direction VR. The processing unit 50 is used in particular to print on the web 12a. The processing unit 50 is followed in the feed direction VR by further sensors 26b, 26c in the form of a second and third camera. In particular, the second camera can be used to check the printing on the web, and the third camera can be used to perform a final inspection of the objects and the web.

A waste winder 52 is used to wind up waste sections of the web 12a, for example excess printed sections of the web. A first splice table 54a is arranged downstream of the first dispensing roll 18a in the feed direction VR. A second splice table 54b is arranged upstream of the first receiving roll 22a in the feed direction VR. Among other things, the splice tables 54a, 54b are used to cut waste sections from the web 12a or to add an additional web (not shown) to the web 12a.

Figure 2:
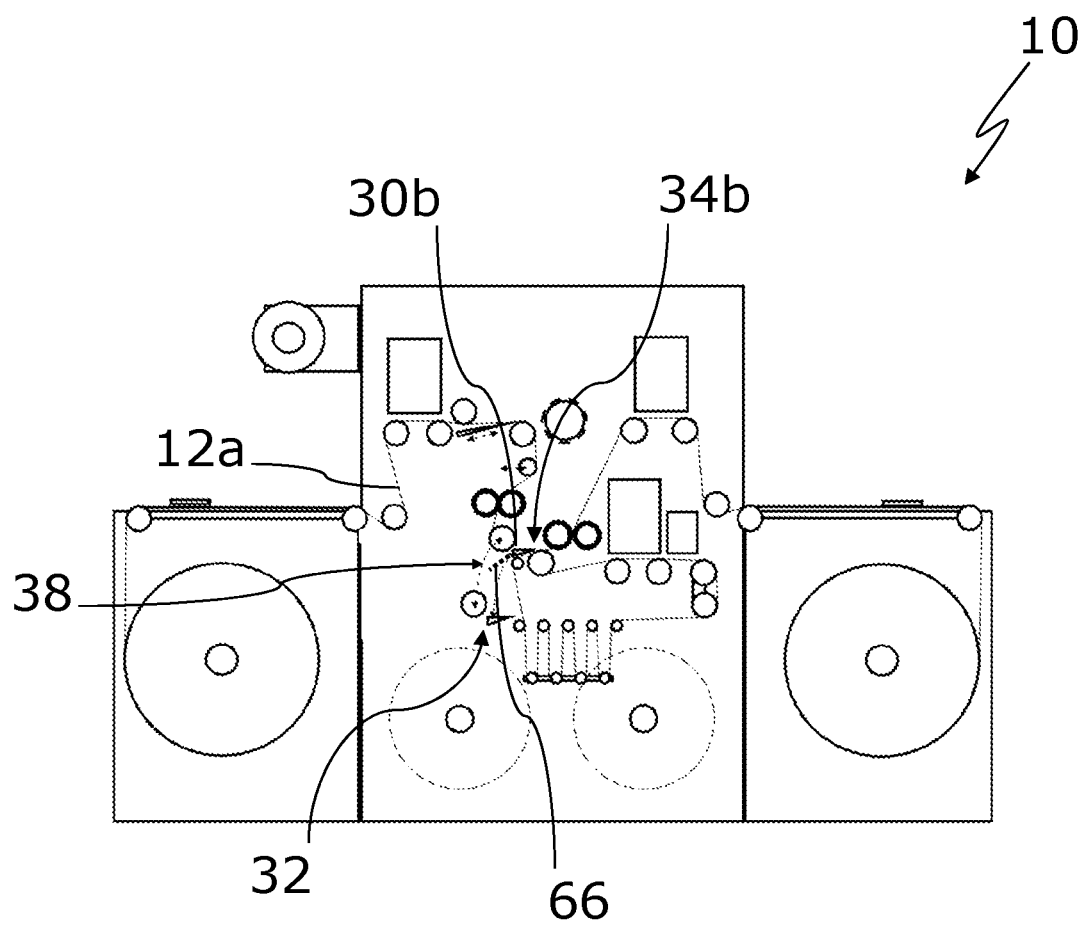
FIG. 2 schematically shows the first embodiment of a device for repairing objects fixed to a web with a transposing device in a translation position.

FIG. 2 schematically shows the device 10 for repairing objects 14, wherein the second transfer edge 30b of the transposing device 32 is pivoted by the pivoting mechanism 38 into the translation position 34b. The pivot mechanism 38 has in particular a pivot arm 66 which is indicated by dashed lines in FIG. 2. The second transfer edge 30b here engages in the web 12a so that the web 12a has an acute bending angle or deflection angle.

Figure 3:
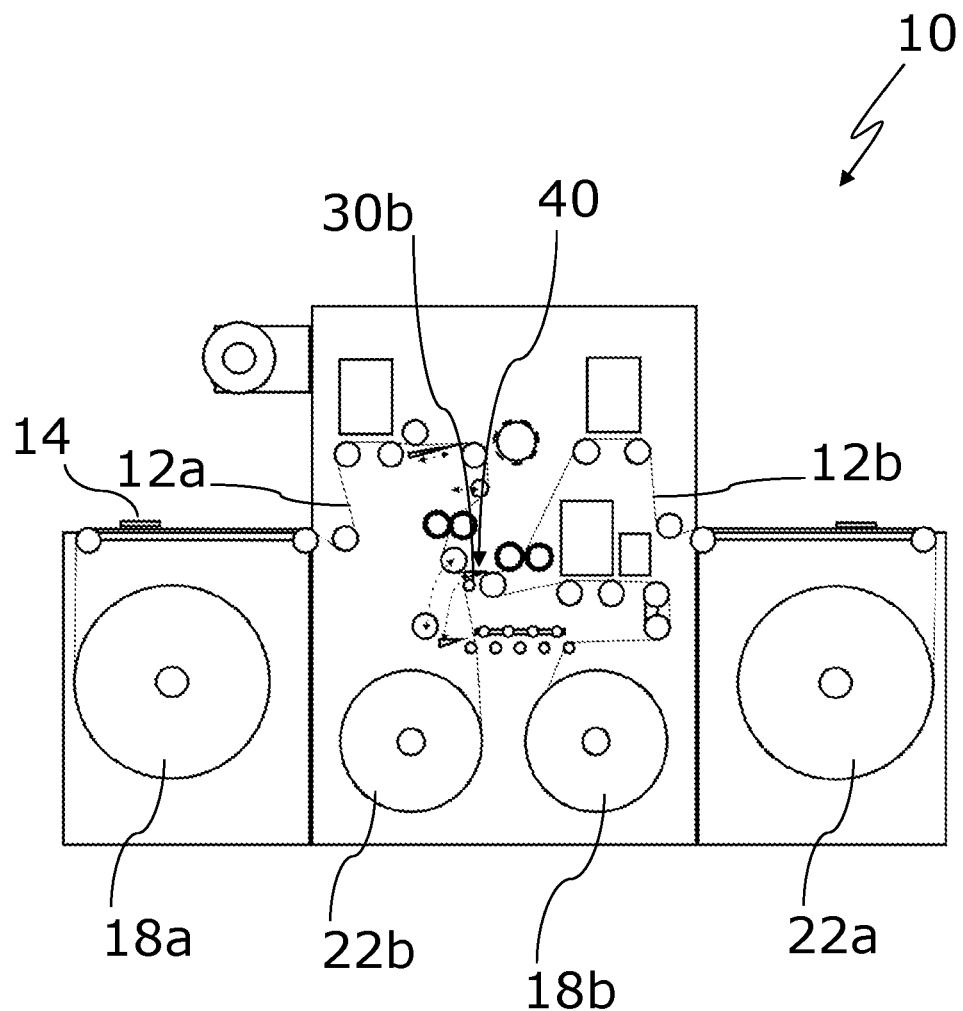
FIG. 3 schematically shows a second embodiment of the device for repairing objects.

FIG. 3 schematically shows a second embodiment of the device 10 for repairing objects 14. In this embodiment, in contrast to the first embodiment, the web 12a is unrolled from the first dispensing roll 18a and rolled onto a second receiving roll 22b. A further web 12b is unrolled from a second dispensing roll 18b and rolled onto the first receiving roll 22a. During the transferring, the objects 14 are transferred by the second transfer edge 30b in the translation position from the web 12a onto a receiving point 40 on the further web 12b. The fault-free objects 14 are transferred from the web 12a to the further web 12b.

Figure 4A:
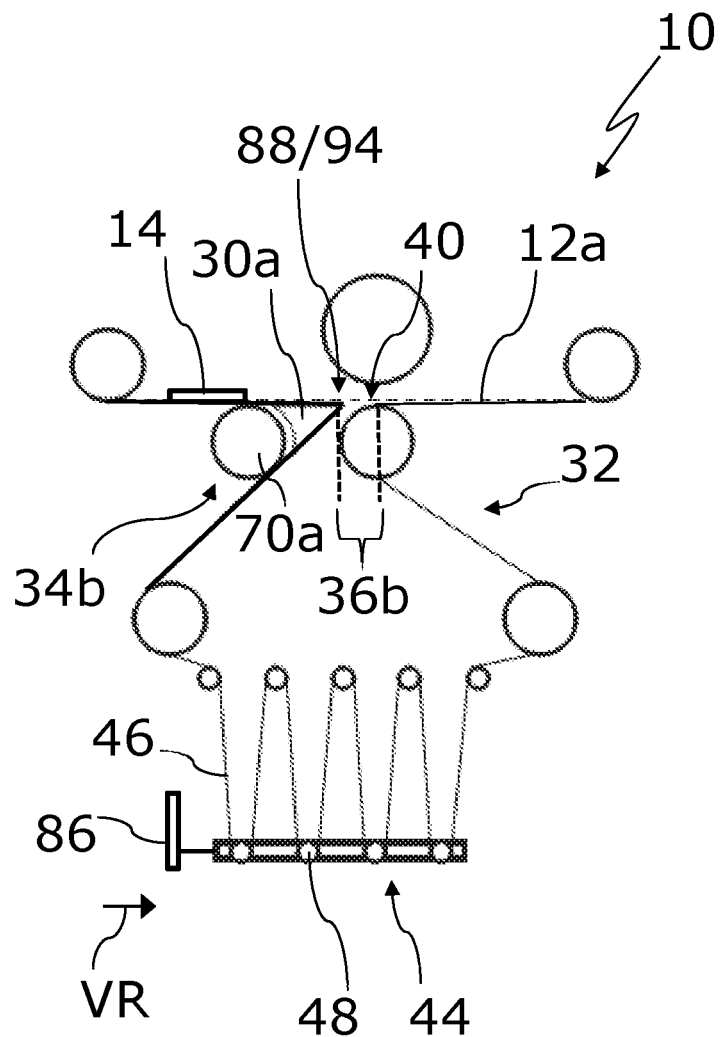
FIG. 4*a* schematically shows a third embodiment of the device for repairing objects with a second embodiment of the transposing device in a translation position.

FIG. 4a schematically shows a third embodiment of the device 10 with a second embodiment of the transposing device 32 in the translation position 34b. The transposing device 32 has the first transfer edge 30a, formed here on a rotary disk 70a.

Figure 4B:
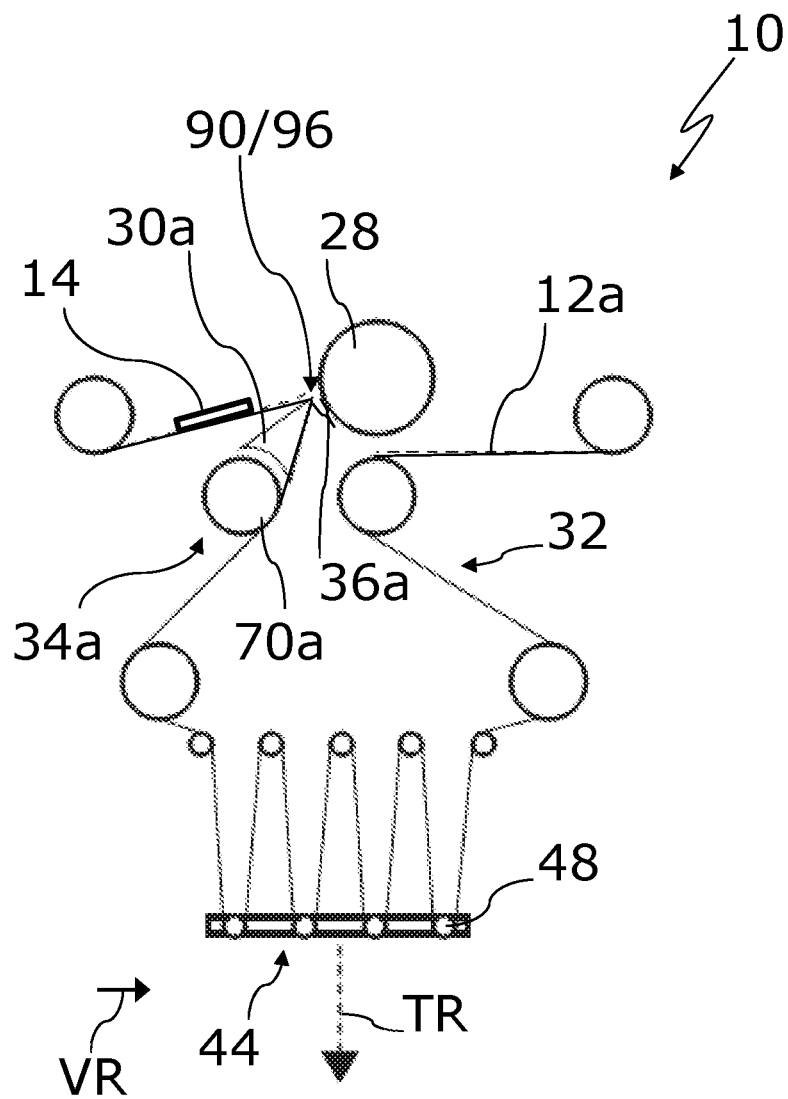
FIG. 4*b* shows the third embodiment of the device for repairing objects with the transposing device in a discharging position.
Figure 4C:
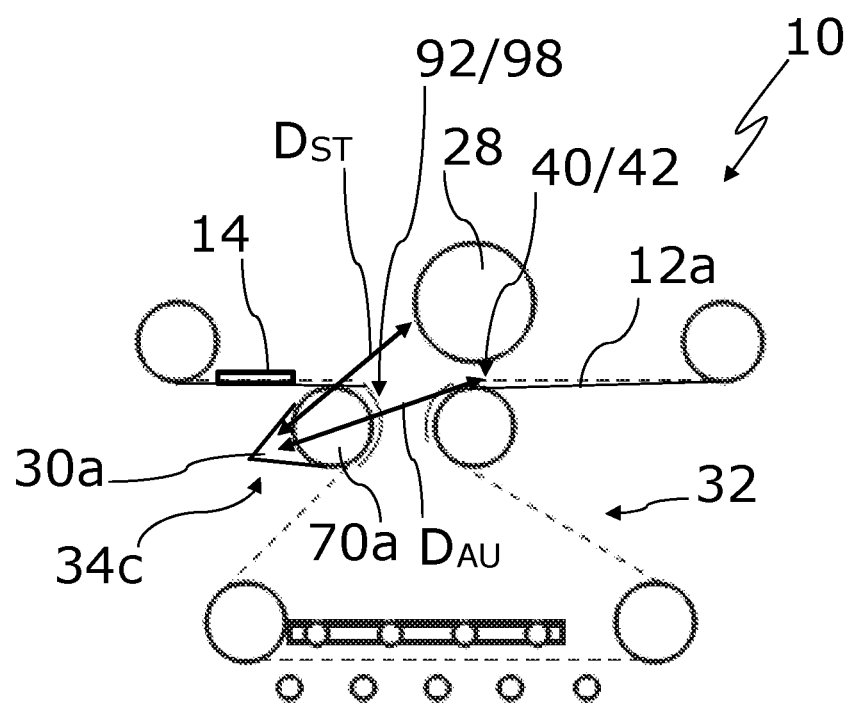
FIG. 4*c* shows the third embodiment of the device for repairing objects with the transposing device in a wrapping position.

The transfer edge 30a is oriented by rotations of the rotary disk 70a in the discharging position 34a (see FIG. 4b), the translation position 34b and/or the wrapping position 34c (see FIG. 4c). The transfer edge 30a has the shape of a wedge. The transfer edge 30a moves into the web 12a, presses against the web 12a and brings about a translation curvature 94 at a translation point 88 of the web 12a, in particular in the form of a bend with an acute bending angle. A front end, in the feed direction VR, of an object 14 fixed to the web 12a, in particular glued on, is released from the web 12a at the point of the bend due to the translation curvature 94 and the inherent stiffness of the object 14 and is conveyed in the direction of a receiving point 40. The transfer distance 36b between the transfer edge 30a and the receiving point 40 is smaller than the length of the object 14 in the feed direction VR, so that the front end of the object 14 reaches the receiving point 40 before the rear end of the object 14 is separated from the web 12a. Through the movement of the web 12a, the object 14 is then pushed onto the web 12a at the receiving point 40. As a result, the object 14 is transferred.

A web storage device 44 of the transposing device 32 for receiving a storage section 46 of the web 12a is in the activated state, into which it is put by an activation mechanism in some embodiments 86. Alternatively, the web storage device 44 can be activated, for example, by its own weight. The web storage rolls 48 of the web storage device 44 arranged in rows are displaced relative to one another and engage in the web 12a, as a result of which the web 12a is formed in a meandering shape.

FIG. 4b shows the third embodiment of the device 10 with the transposing device 32 in the discharging position 34a. The transfer edge 30a is oriented to the bad-part receptacle 28 and assumes the discharging distance 36a from the bad-part receptacle 28, which is smaller than the length of the objects 14 in the feed direction VR. Due to the transfer edge 30a, the web 12a has, in the discharging position 34a, a discharging curvature 96 at a discharging point 90, in particular in the form of a bend with an acute bending angle. The front ends of the faulty objects 14 in the feed direction VR are detached from the web 12a at the fold-over angle when they reach the bend, and are moved to the bad-part receptacle 28. The respective front end adheres to the bad-part receptacle 28 and the respective faulty object 14 is pushed onto the bad-part receptacle 28 by the movement of the web 12a in the feed direction VR. As a result, the faulty object 14 is discharged. The web storage rolls 48 are capable of being displaced perpendicular to the feed direction in a transverse direction TR to change the capacity of the web storage device 44.

FIG. 4c shows a third embodiment of the device 10 with the second embodiment of the transposing device 32 in the wrapping position 34c. The transfer edge 30a is directed away from the bad-part receptacle 28 and the position 42, which each receiving point 40 assumes during the transferring of the respective object 14 to the receiving point 40 (see FIG. 4a). The rotary disk 70a is arranged between the transfer edge 30a and the bad-part receptacle 28 and between the transfer edge 30a and the position 42 of the receiving point 40. The web 12a abuts the rotary disk 70 in a wrapping section 92. The wrapping curvature 98 of the wrapping section 92 varies along the rotary disk 70a.

In particular, the wrapping curvature 98 assumes smaller values than the discharging curvature 96 during the discharging and the translation curvature 94 during the transferring (see FIGS. 4a, 4b) so that no objects 14 are separated from the web 12a. During the unrolling of the web 12a, the transfer edge 30a has a greater distance DAU from the position 42, which each receiving point 40 assumes during the transferring of the respective object 14 onto the receiving point 40 (see FIG. 4a), than the transfer distance 36b (see FIG. 4a) and a greater distance $D_{ST}$ from the bad-part receptacle 28 than the discharging distance 36a (see FIG. 4b).

Figure 5:
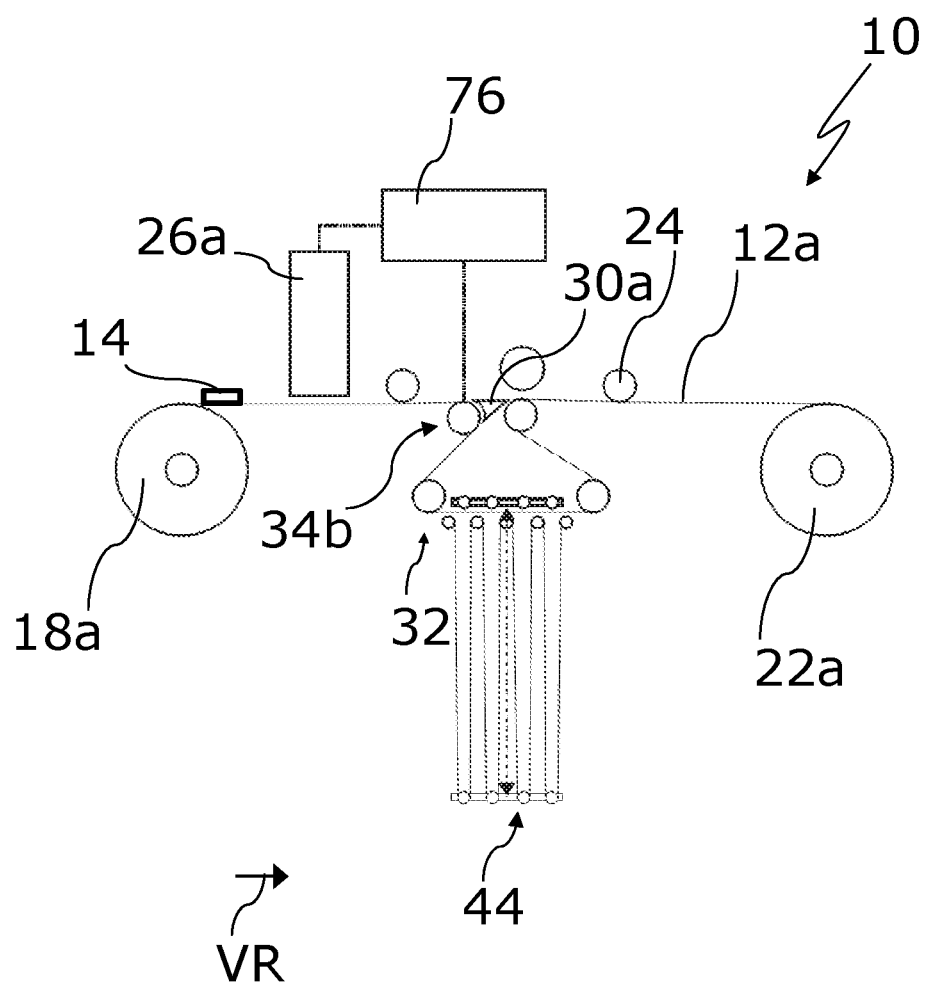
FIG. 5 shows a fourth embodiment of the device with the transposing device in the second embodiment.

FIG. 5 shows a fourth embodiment of the device 10 with the transposing device 32 in the second embodiment. The web 12a is unrolled from a first dispensing roll 18a to a first receiving roll 22a in the feed direction VR. The transposing device 32 is formed with the web storage device 44. A first sensor 26a is arranged upstream of the transposing device 32 in the feed direction VR of the objects 14. The first sensor 26a upstream of the transposing device 32 carries out the testing of the fault-free and faulty objects 14. A controller 76 controls the device 10. In particular, on the basis of the signals of the first sensor 26a, the controller 76 initiates the pivoting of the transfer edge 30a into the translation position 34b for transferring the fault-free objects 14 or into the discharging position 34a for discharging the faulty objects 14 (see FIGS. 4a, 4b). FIG. 5 shows the transfer edge 30a in the translation position 34b. Transport rolls 24 are used to guide the web 12a.

Figure 6:
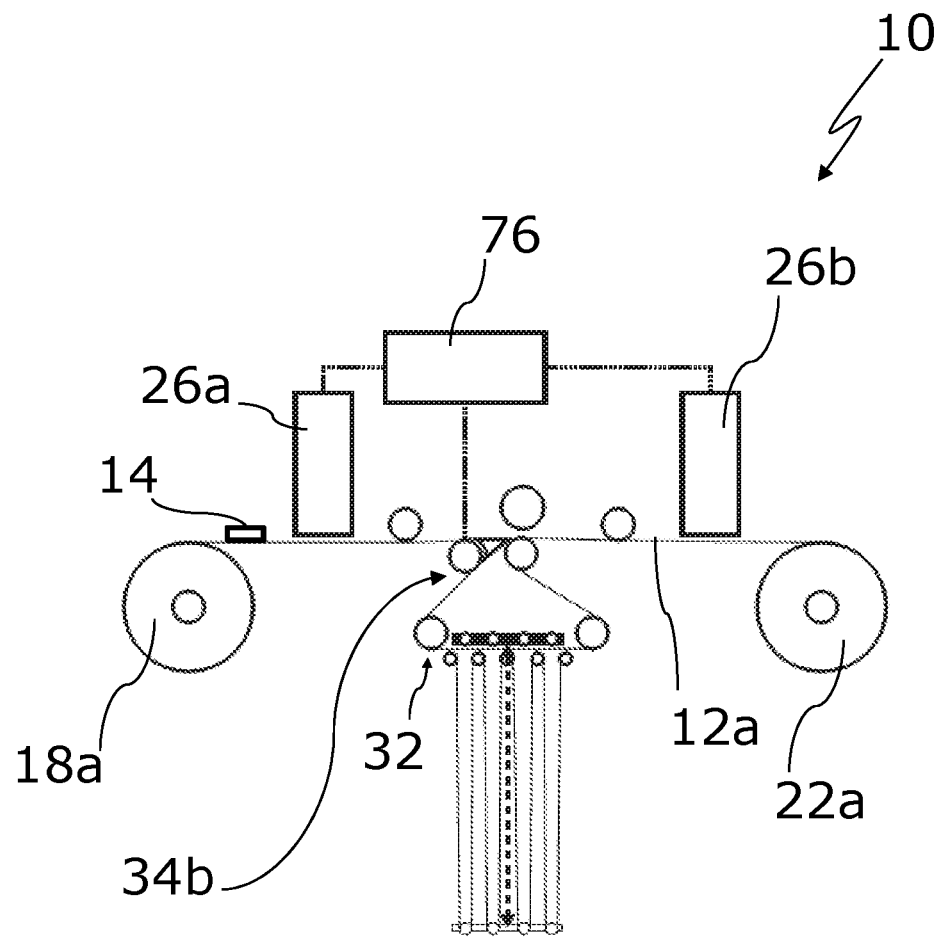
FIG. 6 shows a fifth embodiment of the device.

FIG. 6 shows a fifth embodiment of the device 10 with the first dispensing roll 18a, the first receiving roll 22a, the controller 76 and the first sensor 26a. In contrast to the fourth embodiment, a second sensor 26b is arranged downstream of the transposing device 32. The second sensor 26b downstream of the transposing device 32 carries out the testing of the objects 14 after the transferring or the discharging; in particular, it checks whether the position of the fault-free objects 14 on the web 12a is correct and whether the faulty objects 14 have been discharged. A final validation is performed by the second sensor 26b.

Figure 7:
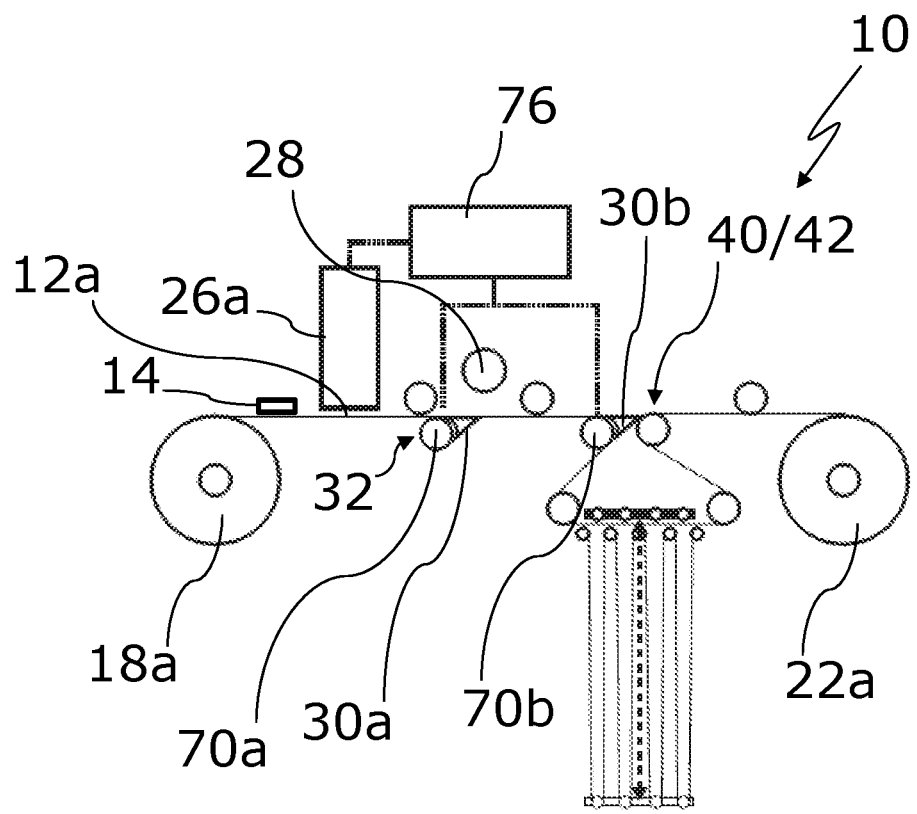
FIG. 7 shows a sixth embodiment of the apparatus.

FIG. 7 shows a sixth embodiment of the device 10 with the first dispensing roll 18a, the first receiving roll 22a, the controller 76 and the first sensor 26a. In contrast to the fourth embodiment, the transposing device 32 has, in addition to the first transfer edge 30a, which is formed on the rotary disk 70a, the second transfer edge 30b, which is formed on a further rotary disk 70b.

The first transfer edge 30a is arranged closer to the bad-part receptacle 28 than the second transfer edge 30b. The second transfer edge 30b is arranged closer to the position 42 of each receiving point 40 on the web 12a during the transferring of the respective object 14 to the receiving point 40 than the first transfer edge 30a. The first sensor 26a is arranged upstream of the first transfer edge 30a. The transferring takes place via the first transfer edge 30a before the discharging via the second transfer edge 30b. The transferring and discharging functions of the transposing device 32 are divided among the first and second transfer edges 30a, 30b, as a result of which the bad-part receptacle 28 and the position 42 of each receiving point 40 can be arranged more flexibly during the transferring of the respective object 14 onto the receiving point 40. A structural separation of the functions of the transposing device 32 between the two transfer edges 30a, 30b takes place.

Figure 8:
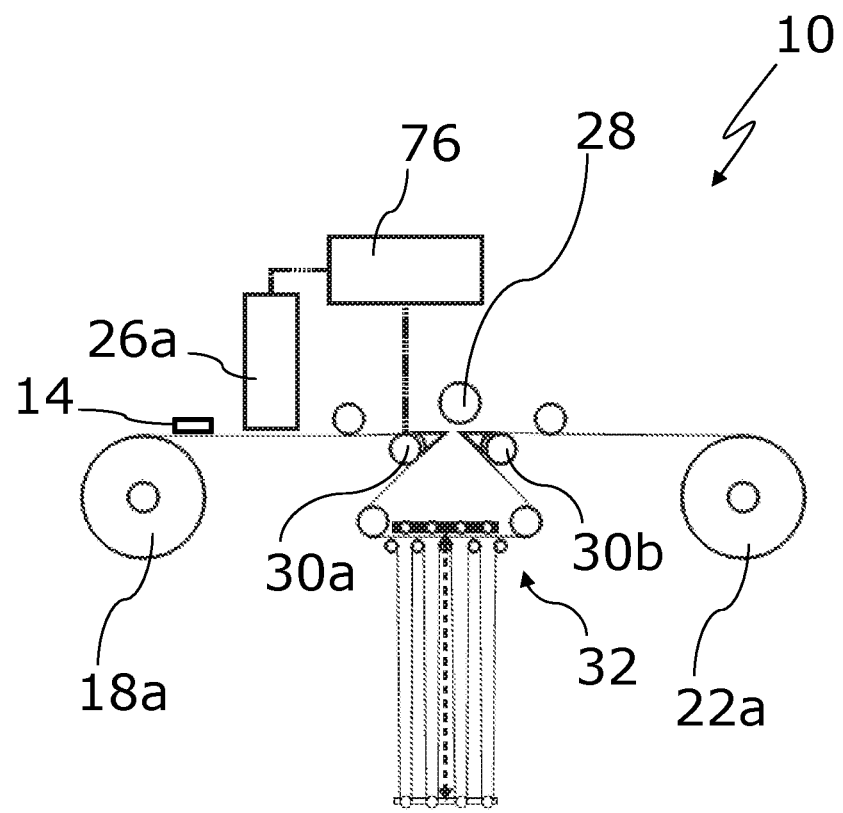
FIG. 8 shows a seventh embodiment of the device.

FIG. 8 shows a seventh embodiment of the device 10 with the first dispensing roll 18a, the first receiving roll 22a, the first sensor 26a and the controller 76. In contrast to the sixth embodiment, the first and second transfer edges 30a, 30b of the transposing device 32 are arranged at the same distance from the bad-part receptacle 28. The second transfer edge 30b is situated opposite the first transfer edge 30a. Both transfer edges 30a, 30b can be used to discharge faulty objects 14.

Figure 9:
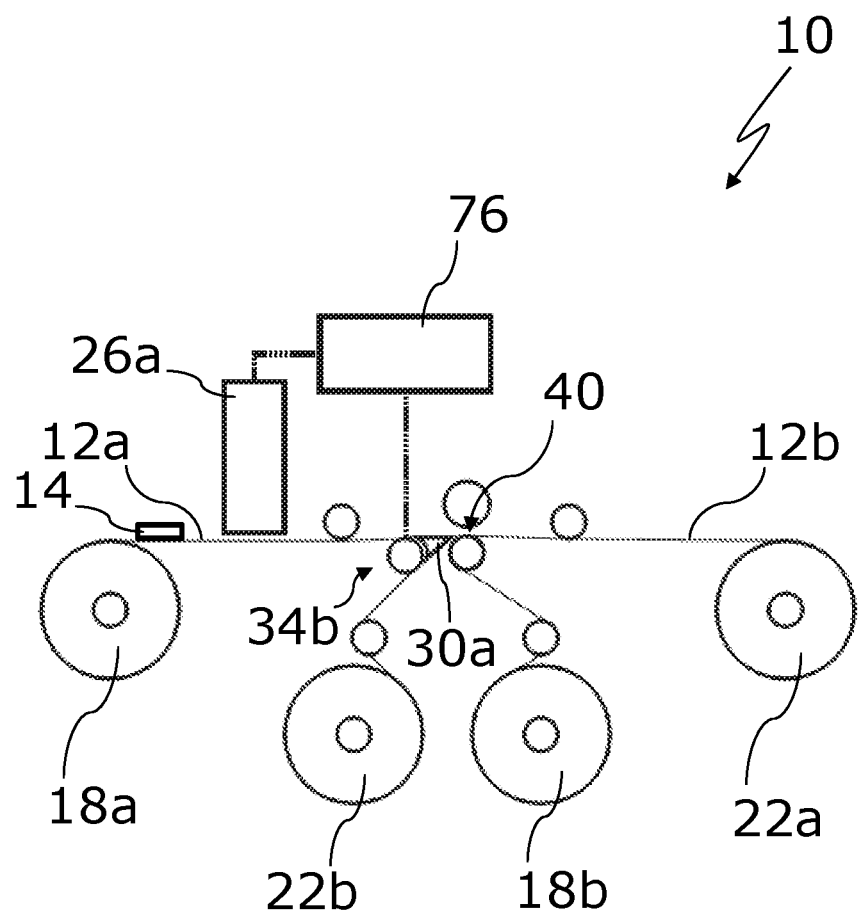
FIG. 9 shows an eighth embodiment of the device.

FIG. 9 shows an eighth embodiment of the device 10 with the first dispensing roll 18a, the first receiving roll 22a, the first sensor 26a and the controller 76. In contrast to the fourth embodiment, the device 10 has a further web 12b next to a web 12a. The web 12a is unrolled from the first dispensing roll 18a and is rolled onto a second receiving roll 22b. The further web 12b is unrolled from a second dispensing roll 18b and is rolled onto the first receiving roll 22a. During the transferring, at least one fault-free object 14 is in each case transferred by the transfer edge 30a in the translation position 34b from the web 12a onto a receiving point 40 on the further web 12b. The fault-free objects 14 are transferred from the web 12a to the further web 12b. The further web 12b replaces in particular a web storage device 44 (see FIG. 1). The further web 12b can be used in particular in the production of multilayer labels.

Figure 10:
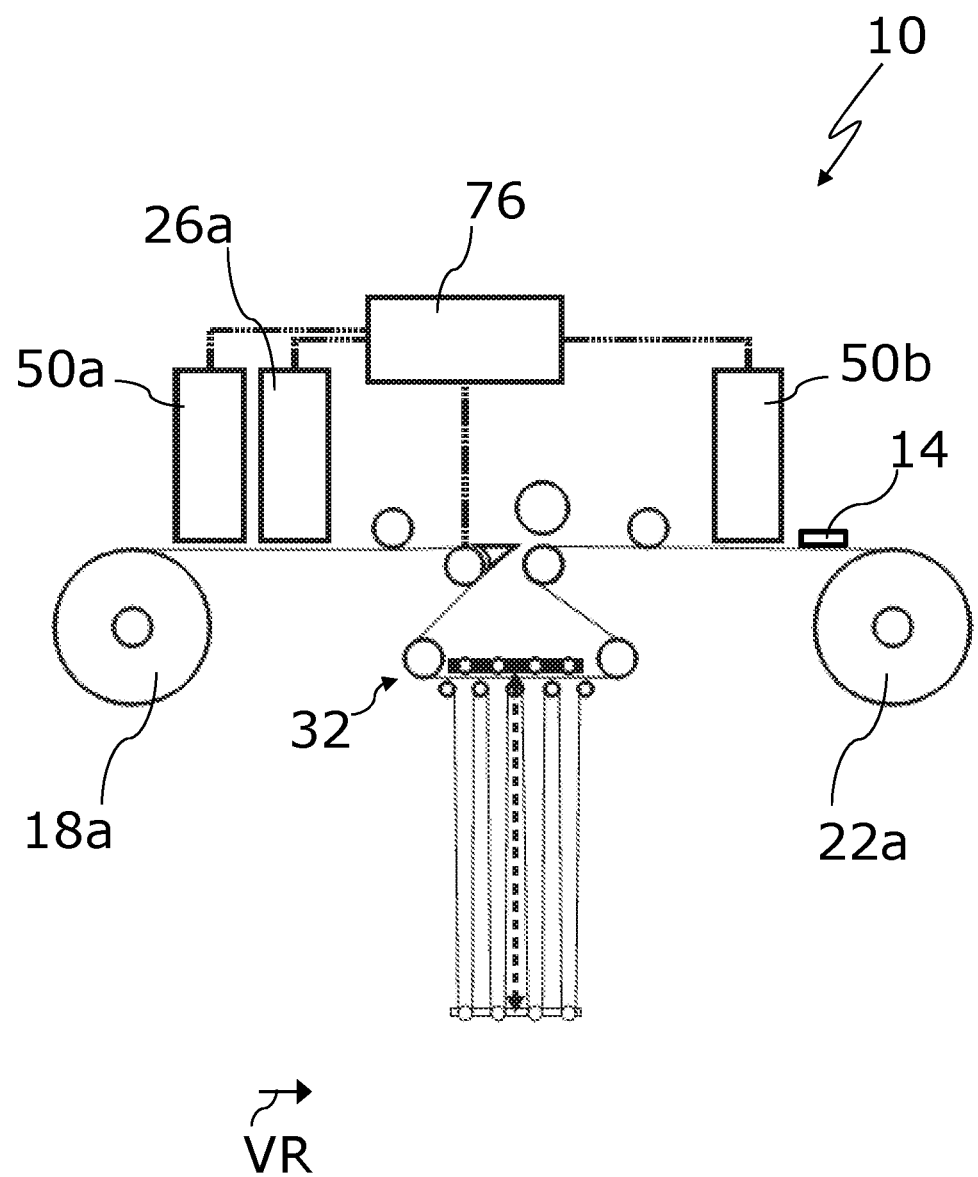
FIG. 10 shows a ninth embodiment of the device.

FIG. 10 shows a ninth embodiment of the device 10 with the first dispensing roll 18a, the first receiving roll 22a, the first sensor 26a and the controller 76. In contrast to the fourth embodiment, the device 10 has a first and a second processing unit 50a, 50b. The first processing unit 50a is arranged upstream of the bad-part receptacle 28 in the feed direction VR and the second processing unit 50b is arranged downstream of the transposing device 32 in the feed direction VR. The processing units 50a, 50b can be used for various steps for processing the objects 14 or the web 12a, such as laminating, dispensing, drying, lasering, punching or printing.

Figure 11:
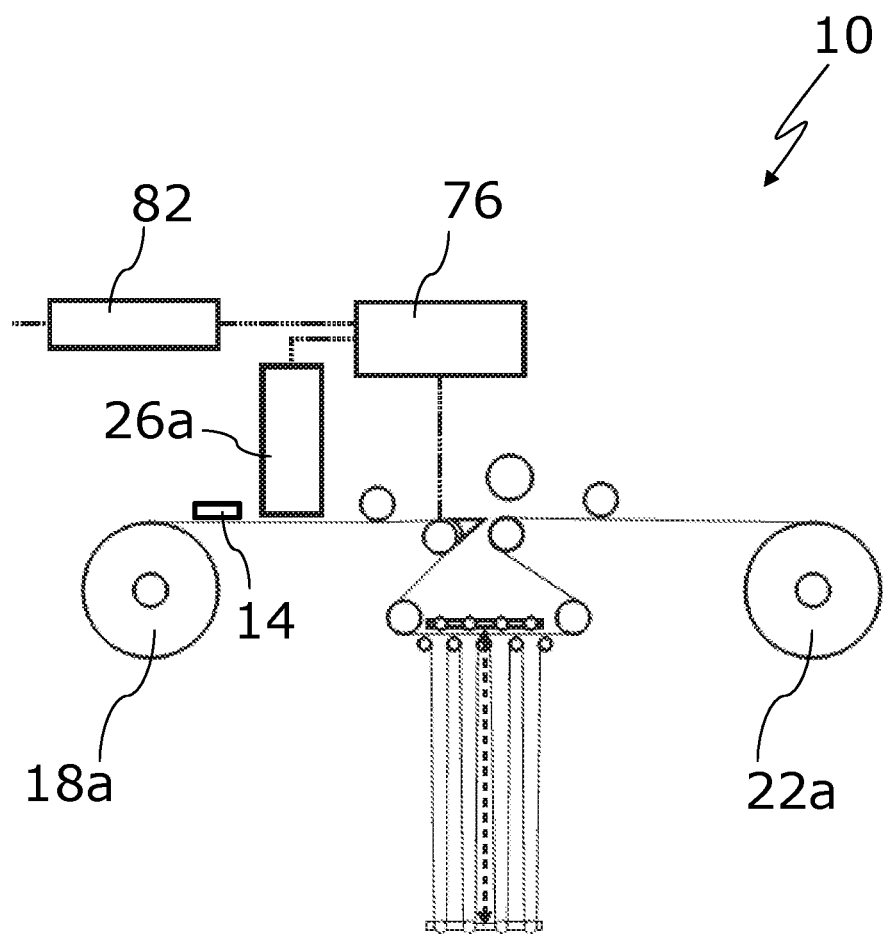
FIG. 11 shows a tenth embodiment of the device.

FIG. 11 shows a tenth embodiment of the device 10 with the first dispensing roll 18a, the first receiving roll 22a, the first sensor 26a and the controller 76. In contrast to the fourth embodiment, the device 10 has an interface 82 in particular for exchanging data with an external data source (not shown). The external data source provides, in particular, data with which the information provided by the first sensor 26a is compared in order to distinguish between faulty and fault-free objects 14. Data from preceding methods can also be used by the interface 82.

Figure 12:
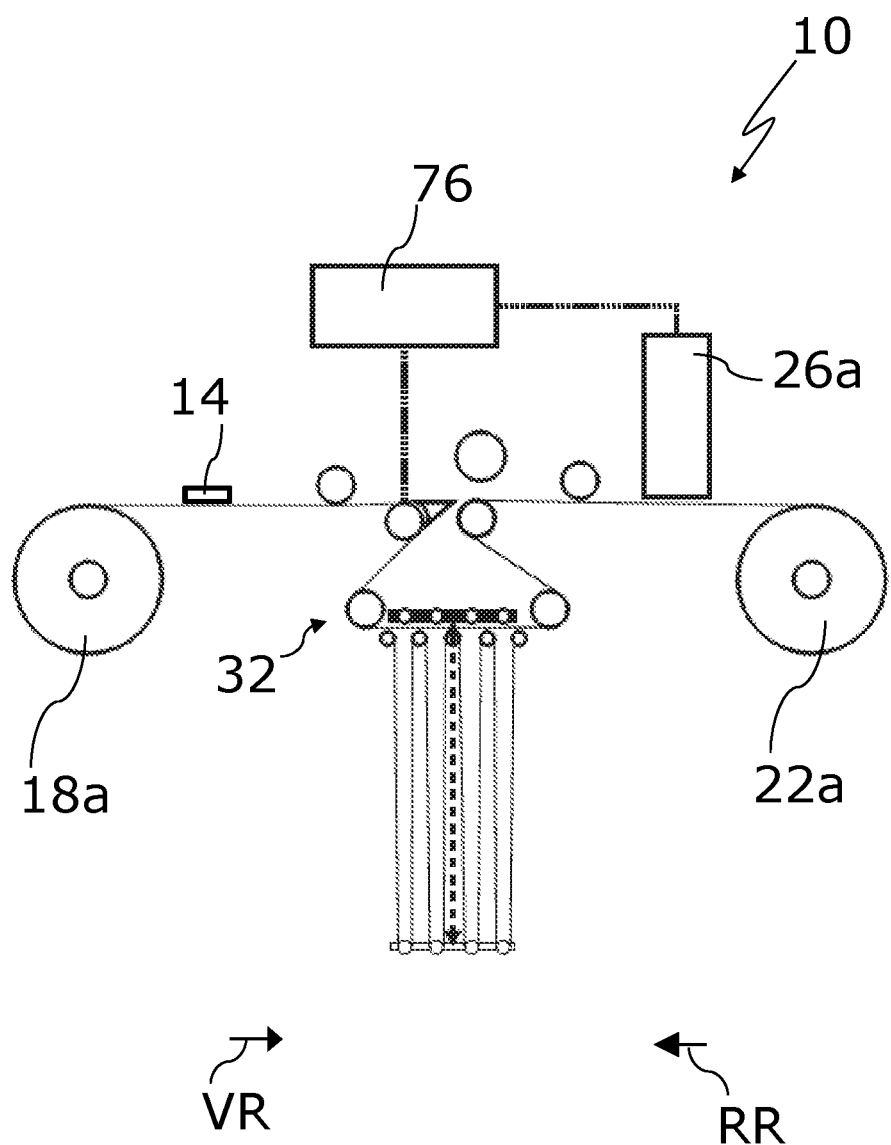
FIG. 12 shows an eleventh embodiment of the device.

FIG. 12 shows an eleventh embodiment of the device 10 with the first dispensing roll 18a, the first receiving roll 22a, the first sensor 26a and the controller 76. In contrast to the fourth embodiment, in this embodiment the first sensor 26a is arranged downstream of the transposing device 32 in the feed direction VR. The web 12a is moved in particular in the reverse direction RR in the opposite direction to the feed direction VR, the first sensor 26a checking the objects 14 for faults. Subsequently, the web 12a is fed in the feed direction VR, wherein fault-free objects 14 are transferred and faulty objects 14 are discharged.

Figure 13:
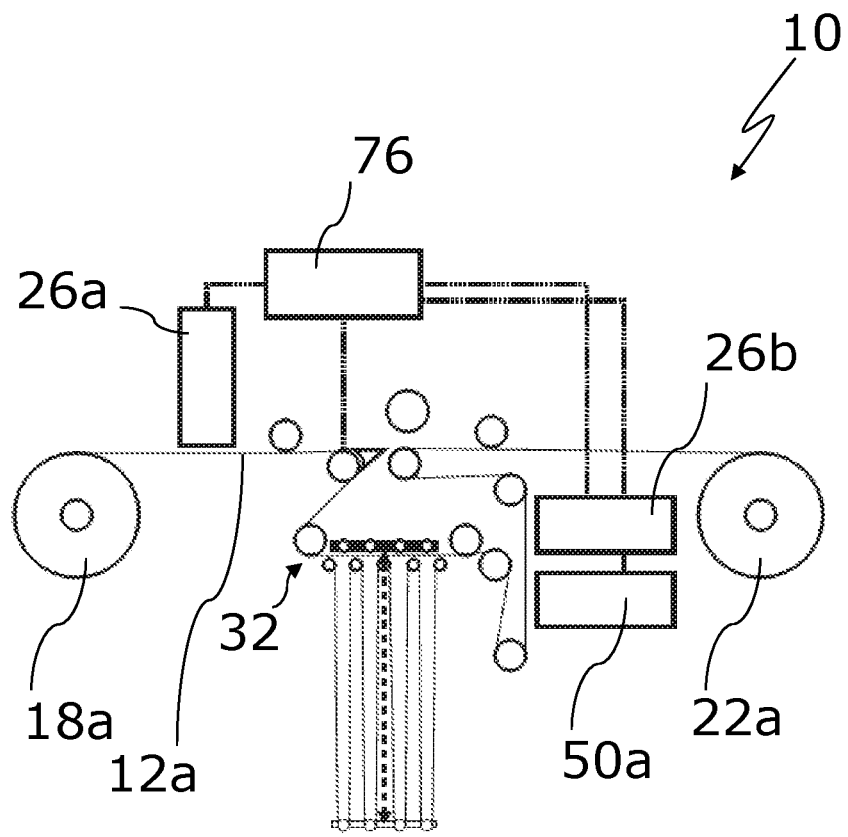
FIG. 13 shows a twelfth embodiment of the device.

FIG. 13 shows a twelfth embodiment of the device 10 with the first discharge roll 18a, the first receiving roll 22a, the first sensor 26a and the controller 76. In contrast to the fourth embodiment, the device 10 has a processing unit 50a on the transposing device 32 and a second sensor 26b downstream of the processing unit 50a in the feed direction VR. The processing unit 50a is in particular designed as a printer in order to print on the web 12a, for example to provide it with a number. The processing unit 50a individualizes the web 12a. The downstream second sensor 26b checks the correct printing of the web 12a.

Figure 14:
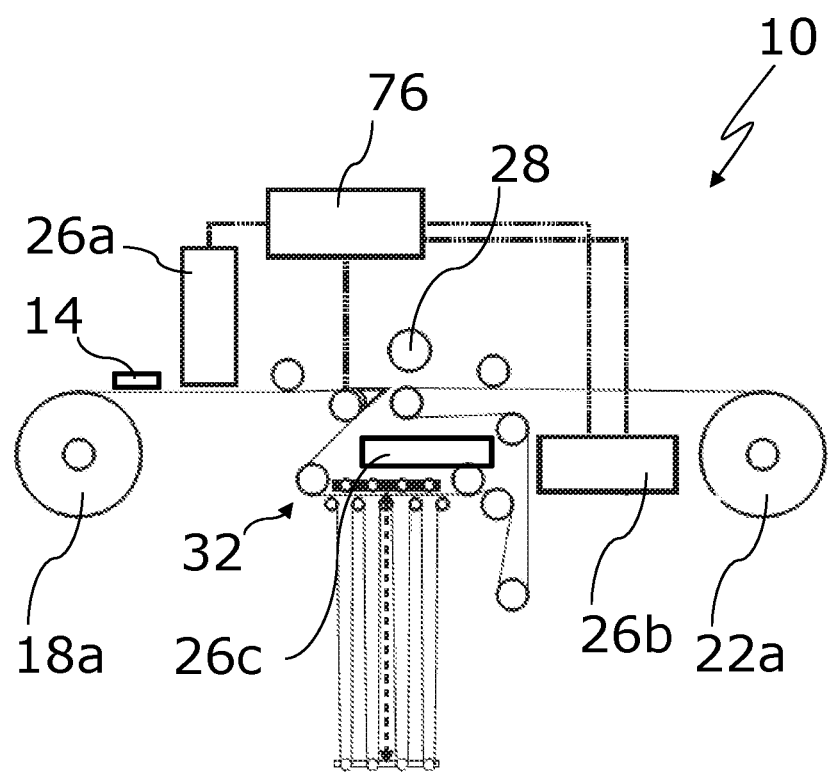
FIG. 14 shows a thirteenth embodiment of the device.

FIG. 14 shows a thirteenth embodiment of the device 10 with the first dispensing roll 18a, the first receiving roll 22a, the first sensor 26a and the controller 76. In contrast to the fourth embodiment, the device 10 has a second and third sensor 26b, 26c on the transposing device 32, which are arranged opposite one another on the web 12a. The sensors 26b, 26c check in particular the front side and rear side of the web 12a for soiling, faults or other optical detectable features, such as, for example, dirt spots on transparent webs 12a. This information can then also be used by a sensor (not shown) downstream of the bad-part receptacle 28 or the transposing device 32 in order to avoid incorrect classification of objects 14.

Figure 15:
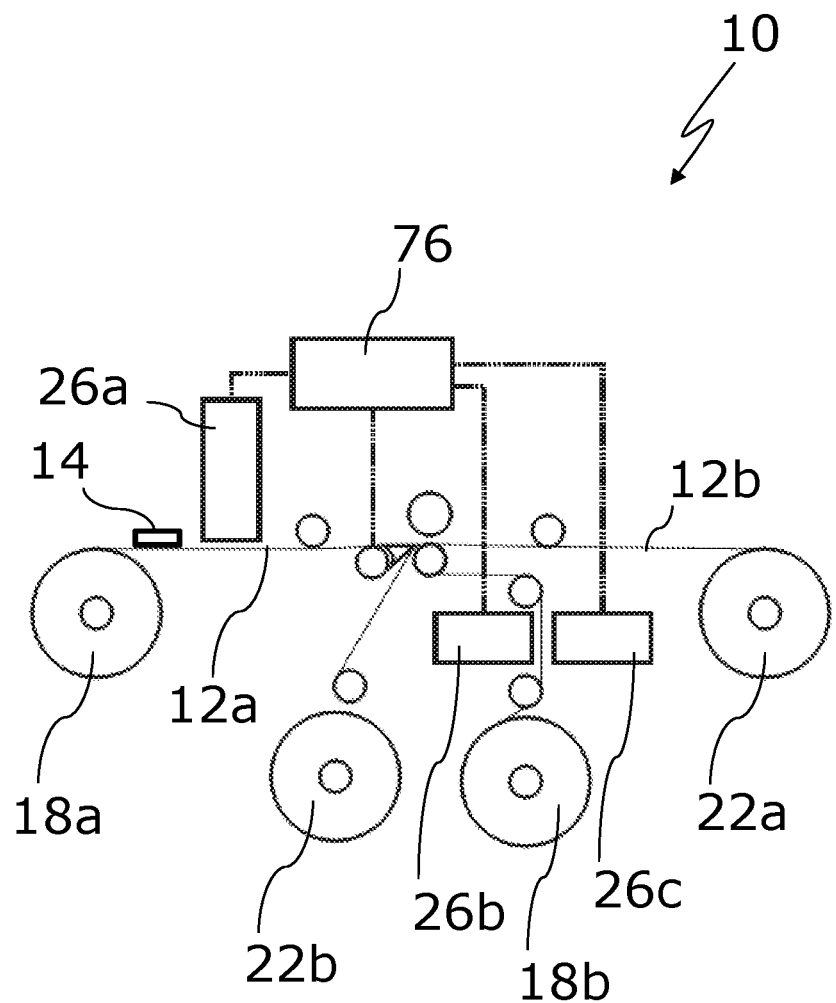
FIG. 15 shows a fourteenth embodiment of the device.

FIG. 15 shows a fourteenth embodiment of the device 10 with the first dispensing roll 18a, the first receiving roll 22a, the first sensor 26a and the controller 76. In contrast to the fifteenth embodiment, the device 10 has the further web 12b, wherein the web 12a is unwound from a first dispensing roll 18a to a second receiving roll 22b and the further web 12b is unwound from a second dispensing roll 18b to the first receiving roll 22a. The fault-free objects 14 are transferred from the web 12a to the further web 12b. A second sensor 26b and a third sensor 26c are arranged opposite one another on the further web 12b in order to check the further web 12b for soiling or faults.

Figure 16:
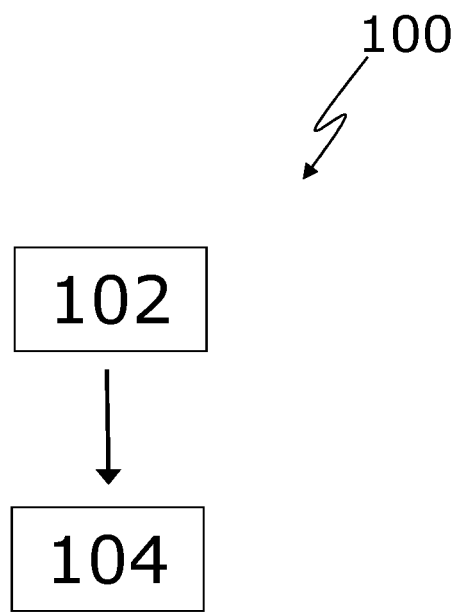
FIG. 16 schematically shows a method for repairing objects.

FIG. 16 schematically shows a method 100 for the repair of objects 14 fixed to a web 12 using a transposing device 32, wherein the transposing device 32 can be oriented in a discharging position 34a, in which during the transferring, the transposing device 32 brings about, by means of an in particular first displacement means 6a, a discharging curvature 96 of the web 12a at a discharging point 90 of the web 12a for the discharging of faulty objects 14, and/or the transposing device 32 can be oriented in a translation position 34b, in which, during the transferring of at least one fault-free object 14, the transposing device 32 brings about, by means of an in particular second displacement means 6b, a translation curvature 94 of the web 12a at a translation point 88 of the web 12a for the purpose of transferring the fault-free object 14, in particular using a device 10 according to any of the preceding embodiments. The web 12a is fed in a first step 102 by a web feed (8) in a feeding direction (VR). In a second step 104, during the unrolling of the entire web 12a or a set part of the web 12a the transposing device 32 is oriented into a wrapping position 34c, in which the transposing device 32 brings about a wrapping curvature 98 of a wrapping section 92 of the web 12a during the feeding of the entire web 12a or an adjustable part of the web 12a, which wrapping section comprises the translation point 88 and the discharging point 90, wherein the maximum value of the wrapping curvature 98 is smaller than the discharging curvature 96 and the translation curvature 94.

Taking all the figures of the drawing together, the invention relates to a device 10 for repairing objects 14 fixed to a web 12a. A web feed 8 causes a feeding of the web a in a feed direction VR. A sensor 26a of the device 10 is used to detect faulty and fault-free objects 14 on the web 12a, wherein the fault-free objects 14 meet a predetermined selection criterion that the faulty objects 14 do not meet. The device 10 has a transposing device 32 which is designed to, in a translation position 34b, transfer at least one fault-free object 14 to a receiving point 40 on the web 12a or on a further web 12b. The transposing device 32 is furthermore designed to, in a discharging position 34a, transfer faulty objects 14 into a bad-part receptacle 28. In the discharging position 34a, during the discharging, by means of an in particular first displacement means 6a the transposing device 32 brings about a discharging curvature 96 of the web 12a at a discharging point 90 of the web 12a for discharging the faulty objects 14. In the translation position, during the transferring of the object 14, the transposing device 32 brings about, by means of an in particular second displacement means 6b, a translation curvature 94 of the web 12a at a translation point 88 of the web 12a for transferring the fault-free object 14. The device 10 is characterized by a wrapping position 34c of the transposing device 10 into which the transposing device 32 can be pivoted during the feeding of the complete web 12a or of a part of the web 12a, wherein in the wrapping position 34c the transposing device 32 brings about a wrapping curvature 98 of a wrapping section 92 of the web 12a, which section comprises the translation point 88 and the discharging point 90, wherein the maximum value of the wrapping curvature 98 is smaller than the discharging curvature 96 and the translation curvature 94.

What is claimed is:

1. A device for repairing and/or inspecting objects fixed to a web, wherein the device comprises:
   a web feed configured for feeding the web in a feed direction;
   a first sensor configured for selecting fault-free objects on the web that meet a predetermined selection criterion, and faulty objects that do not meet the selection criterion;
   a bad-part receptacle configured for receiving the faulty objects;
   a receiving point on the web configured for receiving at least one fault-free object;
   a transposing device configured for transferring faulty objects from the web into the bad-part receptacle in a discharging position of the transposing device, in which during the discharging the transposing device brings about, by means of first displacement means, a discharging curvature of the web at a discharging point of the web for discharging the objects, and configured for transferring the fault-free object from the web to the receiving point in a translation position of the transposing device, in which, during the transferring of the fault-free object, the transposing device brings about, by means of a second displacement means, a translation curvature of the web at a translation point of the web for transferring the fault-free object; and
   a wrapping position of the transposing device configured for maintaining the original positions of the objects on the web prior to feeding the web, in which the transposing device brings about a wrapping curvature of a wrapping section of the web during feeding of the entire web or an adjustable part of the web, which section comprises the translation point and the discharging point, wherein a maximum value of the wrapping curvature is smaller than the discharging curvature and the translation curvature.

2. The device according to claim 1, wherein the transposing device has at least one transfer edge configured for advancing the web in the discharging position and/or the translation position of the transposing device.

3. The device according to claim 2, including a pivot mechanism configured for pivoting the transfer edge between the discharging position, the translation position and/or the wrapping position, wherein the transfer edge is formed on a rotary disk on which the web extends along the transfer edge in the wrapping position.

4. The device according to claim 3, wherein the transfer edge is formed on a pivot arm configured for pivoting the transfer edge out of the wrapping position into the translation position.

5. The device according to claim 2, wherein the transposing device has a first and a second transfer edge, wherein the first transfer edge is arranged closer to the bad-part receptacle than the second transfer edge and the second transfer edge is arranged closer to the position that each receiving point assumes during the transferring of the respective object onto the receiving point than the first transfer edge or the transfer edges are arranged at the same distance from the bad-part receptacle.

6. The device according to claim 1, wherein the bad-part receptacle is arranged, in the feed direction of the objects, upstream of the position of each receiving point during the transferring of the respective object onto the receiving point.

7. The device according to claim 1, wherein in the feed direction of the objects, a web storage device is arranged downstream of the transposing device or as a part of the transposing device configured for guiding through a storage section of the web with adjustable length.

8. The device according to claim 1, wherein the first sensor and a second sensor is arranged in the feed direction of the objects, upstream of the transposing device, on the transposing device and/or downstream of the transposing device, and/or upstream of the receiving point and/or downstream of the receiving point, wherein the device has an interface for storing data and/or for exchanging data with an external data source and/or has at least one processing unit which is arranged on the web.

9. A method using the device according to claim 1 for repairing and/or inspecting objects fixed to the web using the transposing device, wherein the transposing device can be oriented into the discharging position in which during the discharging the transposing device brings about, by means of the first displacement means, the discharging curvature of the web at the discharging point of the web for the discharging of faulty objects, and/or the transposing device can be oriented into the translation position in which, during the transferring of at least one fault-free object, the transposing device brings about, by the second displacement means, the translation curvature of the web at the translation point of the web for transferring the fault-free object, wherein the web is fed by the web feed in the feed direction, wherein the transposing device is oriented during the feeding of the entire web or of the set part of the web into the wrapping position in which the transposing device brings about the wrapping curvature of the wrapping section of the web, which comprises the translation point and the discharging point, wherein the maximum value of the wrapping curvature is smaller than the discharging curvature and the translation curvature.

10. The method according to claim 9, wherein the first sensor detects the fault-free and/or faulty objects on the web.

11. The method according to claim 10, wherein the method comprises the successive steps of where:
   i) the web is initially fed, wherein the transposing device is oriented in the wrapping position or the translation position;
   ii) the first sensor detects a faulty object; and
   iii) the rest of the web is subsequently fed, wherein the transposing device is oriented in the discharging position and/or the translation position and/or the wrapping position.

12. The method according to claim 11, wherein the method comprises the successive steps of where:
   iv) the web is first moved completely against the feed direction;
   v) the web is subsequently fed completely or partially in the feed direction, wherein the transposing device is oriented in the discharging position, the translation position and/or the wrapping position.

13. The method according to claim 12, wherein the first sensor detects the fault-free and/or faulty objects on the web while the web is moved according to step (iv), wherein features of the objects detected by the first sensor during the movement of the web according to step (iv) are stored.

* * * * *

UNITED STATES PATENT AND TRADEMARK OFFICE
CERTIFICATE OF CORRECTION

PATENT NO. : 12,473,115 B2  
APPLICATION NO. : 18/312786  
DATED : November 18, 2025  
INVENTOR(S) : Ivan Bonev Page 1 of 1

It is certified that error appears in the above-identified patent and that said Letters Patent is hereby corrected as shown below:

On the Title Page

Column 1, below the Related U.S. Application Data:  
Insert item (30) --Foreign Application Priority Data  
Nov. 9, 2020 (DE)........................ 10 2020 214 042.1--.

Signed and Sealed this  
Thirteenth Day of January, 2026

John A. Squires  
*Director of the United States Patent and Trademark Office*